United States Patent [19]
Katagiri et al.

[11] 3,864,021
[45] Feb. 4, 1975

[54] LIQUID CRYSTAL DISPLAY DEVICE AND METHOD FOR PROCESSING THE SURFACE OF ELECTRODE GLASS THEREOF

[75] Inventors: Yoshio Katagiri; Yoshio Miyata, both of Sendai, Japan

[73] Assignees: Kabushiki Kaisha Daini Seikosha; Kabushiki Kaisha Seikosha, both of Tokyo, Japan

[22] Filed: Mar. 6, 1973

[21] Appl. No.: 338,625

[30] Foreign Application Priority Data
Mar. 8, 1972    Japan................................ 47-23813

[52] U.S. Cl............................ 350/160 LC, 117/218
[51] Int. Cl.............................................. G02f 1/16
[58] Field of Search ....... 350/160 LC, 150; 117/218

[56] References Cited
UNITED STATES PATENTS

| | | | |
|---|---|---|---|
| 3,694,053 | 9/1972 | Kahn.................................... | 350/150 |
| 3,700,306 | 10/1972 | Cartwell et al...................... | 350/150 |
| 3,728,008 | 4/1973 | Allan et al..................... | 350/160 LC |

*Primary Examiner*—Edward S. Bauer
*Attorney, Agent, or Firm*—Robert E. Burns; Emmanuel J. Lobato; Bruce L. Adams

[57] ABSTRACT

The surface of an electrode in contact with the layer of a liquid crystal in a liquid crystal display device is coated with fluoroplastic or fluorocarbon polymer to maintain the liquid crystals oriented for a substantial time after rubbing the surface of the layer of fluoroplastic with a sheet of cloth or paper along a predetermined direction. The thus oriented molecules of the liquid crystal causes polarized light to be rotated, thereby allowing color modification and the on-off control of the display device in combination with polarizers in response to the application of an electric field to portions of an electrode sandwich in a liquid crystal display device.

8 Claims, No Drawings

3,864,021

LIQUID CRYSTAL DISPLAY DEVICE AND METHOD FOR PROCESSING THE SURFACE OF ELECTRODE GLASS THEREOF

BACKGROUND OF THE INVENTION

The present invention relates to a liquid crystal display device, a method for displaying information on such a device and a method for processing the surface of an electrode glass used in the liquid crystal display device and the resultant processed glass.

FIELD OF THE INVENTION

It has been known that liquid crystals exhibit regular orientation under influence of charges and fields in and on the solid surface in contact therewith. It has been, for example, known that glass or polymeric surfaces rubbed with a cloth in a predetermined direction causes the liquid crystal contacting with the surface thereof to be oriented with respect to the rubbed direction. Further, it has been known that the sandwiching of the liquid crystal between two sheets of glass, the surfaces of which are rubbed in the direction opposite to each other causes the liquid crystal to be oriented with respect to both rubbed directions, with the angle of orientation resulting from the composite orientation of the rubbed direction. This causes the polarization plane of light to be rotated by an angle equal to the angle between two rubbed directions. Accordingly, when polarizers are provided on both sides of two sheets of glass sandwiching the liquid crystal, this allows variation of the tone or on-off control according to the angles between the polarization planes of the two polarizers and the orientation plan of the liquid crystal between two sheets of glass sandwiching the liquid crystal and having the different rubbed directions, thus making possible modification and changes as well as the application of display information to the display device.

The method for rubbing the surface of the glass with the cloth, however, has the drawback of causing the orientation in the liquid crystal molecules for only a short time after which the orientation of the liquid crystal is lost with the result of unsuitability for application of the display device for display of the information over suitable periods of time.

SUMMARY OF THE INVENTION

An object of the present invention is to provide a liquid crystal display device and a processing method wherein thin coating of fluoroplastic or fluorocarbon is formed on the surface of the glass to hold the orientation of the molecules in the liquid crystal substantially permanent and the method for providing information displays in such liquid crystal devices.

A method for processing the surface of an electrode glass adapted for use in a liquid crystal display device according to the present invention comprises the steps of forming a transparent conductive coating on the surface of a transparent material for sandwiching a liquid crystal, said surface facing said liquid crystal, and forming a coating of fluorocarbon polymer on the surface of said transparent conductive coating in superimposed relation.

The surface of the coating of fluorocarbon polymer is rubbed along a predetermined direction defined by the direction of a molecular axis in the liquid crystal to be oriented to orient said liquid crystal. The fluorocarbon polymer used in the present invention may be any of the family of fluoroplastics or fluorocarbon polymers. These are characterized by having good chemical and thermal resistance, low dissipation factor and low dielectric constant. The family of fluorocarbon polymers includes the polyfluoro-olefins such as polytetrafluoroethylene (PTFE), polychlorotrifluoroethylene (PCTFE), polyfluoropropylene polyvinylidene fluoride (PVF) and the copolymer fluorinated ethylene propylene (FEP).

Further a liquid crystal display device according to the present invention comprises a transparent support material for sandwiching a liquid crystal, said transparent support material being coated at its one surface facing said liquid crystal with a transparent conductive material to which an electric field may be applied to control said liquid crystal display device, and said conductive material being futher coated at the surface facing said liquid crystal with said fluorocarbon polymer which may be rubbed to further control said display and the information thereon.

DETAILED DESCRIPTION OF PREFERRED EMBODIMENT

The present invention will be described in connection with preferred embodiments.

EMBODIMENT 1

An electrode glass, coated with tin oxide or indium oxide, was rinsed with trichloroethylene or acetone to make the surface thereof clean. After that, the surface was processed in such a manner that it was rubbed in the same direction with powders or a rod of polytetrafluoroethylene (Teflon TFE du Pont) to deposit a film thereon.

Alternatively, a suspension or mixture, wherein pulverized powders of polyethylene fluoride together with a surface activating agent dispersed in water, was applied to the clean surface of the electrode glass or the surface of a clean conductively coated electrode. The surface deposit was then dried by heating and rubbed in the predetermined direction with a sheet of paper or cloth.

It was observed that a contiguous thin coating of PTFE was provided by rubbing the surface of an electrode glass with commercial Teflon TFE (du Pont) of rod-construction in the same direction. This resulted in good orientation of the liquid crystals along their molecular axes. The specific axial orientation depends upon the class of liquid crystal used. The experiment showed continuous orientation of the molecules for a long time.

An electrode glass provided with the directional thin coating of polytetrafluoroethylene was prepared by vacuum-depositing a low polymer of Teflon TFE du Pont on the surface of the electrode glass. Thereafter, the glass plate was rubbed with cloth or paper in a predetermined direction. It was found that the liquid crystal was maintained unchanged in orientation for a long time when the thus prepared electrode was employed in an information display device.

A thin coating of chlorotrifluoroethylene (CTFE) is formed by scattering the powders of this fluoroplastic over the surface of the electrode glass and then rubbing it with a sheet of cloth or paper in a predetermined direction. It was found that the liquid crystal were maintained unchanged in orientation for a long time when it was employed in the display device to create an information display.

The coating of TFE or CTFE should be very thin, and otherwise it disadvantageously results in a high threshold voltage for imprinting the information.

The display device wherein the electrode glass, coated with either TFE or CTFE, is employed can hold the orientation of the crystals even under condition of high temperature and has the function of orientation the liquid crystal stably for a long time because fluorocarbon polymers have resistance to heat.

EMBODIMENT 2

The thin coating of fluorinated ethylene propylene polymer (FEP) was formed on the surface of the glass electrode. The fluorocarbon polymer was a white powder. The rubbing of the coated glass surface along a predetermined direction with a sheet of cloth or paper allowed the directional thin coating of polymer to be formed on the surface of the glass. It was presumed that the directional coating was formed since the crystalline structure of FEP, as is well-known with TFE develops an aberration on the crystalline surface when it is rubbed. The orientation of the molecule in the liquid crystal sandwiched between the thus processed transparent display panels of materials such as glass, plastics or the like is retained for a long time and is uniform over the entire treated surface.

Further, it was noted that the FEP layer maintains the orientation of the liquid crystal even if the display is exposed to a high temperature because of the polymer's high resistance to heat (the temperature at which it begins to deteriorate is about 300° to 400°C).

It is to be noted that the coating of FEP is preferably kept very thin because the threshold voltage for the display device becomes higher as the film becomes thicker.

In a preferred embodiment, the surfaces of the two transparent materials such as glass, plastics or the like are provided with a conductive transparent coating delineating electrodes on the surface thereof in contact with the liquid crystal and are, respectively, rubbed along the predetermined directions with FEP or TFE with the directions crossed, for example, and then the liquid crystal is sandwiched therebetween to orient the liquid crystal, to rotate the polarization plane of light by 90°. The polarizing plates are, respectively, disposed at both sides of the glass sandwich containing the liquid crystal so that their polarization planes are in alignment with the directions along which the sheets of glass are rubbed to maximize the transmitted light.

The application of a sufficient voltage across the conductive layer of the liquid crystal through specific portions of the electrodes activates those portions and causes the liquid crystal to have their polarization and orientation changed due to the electric field, thereby to change the transmission factor of light passing through the voltage-applied portions, thus allowing the display of the shape identical with that of the activated electrode portions.

As mentioned above, the present invention brings about the advantages that the display has a long life because the very thin coating of fluoroplastic is formed on the surface of glass in contact with the liquid crystal, and further the device permits no thermal disturbance in orientation of the liquid crystal even at the high temperature because of its resistance to heat.

What is claimed:

1. A liquid crystal display device comprising a transparent support material for sandwiching a liquid crystal, said material being coated at least at its surfaces adjacent said liquid crystal, with transparent conductive material adapted for localized application of electric fields to control areas of said liquid crystal display device, and said conductive material being further coated at the surface adjacent said liquid crystal with a rubbed layer of fluorocarbon polymer, selected from group consisting of fluorinated polyolefins and their copolymer, rubbed in a predetermined direction.

2. A device according to claim 1, wherein said fluorocarbon is polytetrafluoroethylene.

3. A device according to claim 1, wherein said fluorocarbon is fluorinated ethylene propylene.

4. A device according to claim 1, wherein said fluorocarbon is chlorotrifluoroethylene.

5. A device according to claim 1 wherein said fluorocarbon is polyvinylidene fluoride.

6. A liquid crystal display device comprising at least one light-transparent plate and another plate in spaced relation thereto to define a liquid crystal-containing cavity, said cavity containing a liquid crystal composition whose crystals align in said cavity in response to an electric field applied between at least portions of said plates, both of said plates being coated on their surfaces defining said cavity, first with a transparent conductive material adapted for localized application of electrical fields thereby to locally control the alignment of said liquid crystals in said composition and said conductive coating being overlain by a layer of fluorocarbon polymer, selected from the group consisting of fluorinated polyolefins and their copolymers, which has been oriented by rubbing, thereby to prolong maintenance of liquid crystal orientation.

7. The display device according to claim 6 wherein both of said plates are transparent and polarizing grids are positioned external to and on either side of said cavity-defining plates whereby the rubbed layers provide light polarizing orientation of said liquid crystal for light transmitted through said device and said polarizing grids control the intensity and coloration of said transmitted light.

8. The method for controlling and displaying information via liquid crystals which comprises applying information-containing electrical signals to selected conductive portions of a liquid crystal composition-containing electrode sandwich to impress crystal aligning electrical fields at said selected portions to form information images by crystal orientation at said selected portions, creating a light polarizing effect in said liquid crystal by coating the inner surfaces of said electrode sandwich in contact with said composition with a layer of fluorocarbon polymer, selected from group consisting of fluorinated polyolefins and their copolymers, which has been oriented by rubbing and then viewing said sandwich by transmitted light which passes successively through a first polarizing grid, the sandwich, and then a second polarizing grid.

* * * * *